US007978835B2

(12) United States Patent
Paden et al.

(10) Patent No.: US 7,978,835 B2
(45) Date of Patent: Jul. 12, 2011

(54) SYSTEM AND METHOD FOR AUTOMATICALLY NOTIFYING A CUSTOMER VIA PHONE OF SERVICE RESTORATION

(75) Inventors: Jonathan Paden, Austin, TX (US); Bobby Sams, Austin, TX (US); Paul L. Dent, Austin, TX (US); Scott Andrew Newman, Little Elm, TX (US); Jon Harris, Little Elm, TX (US); Stanford E. Pennington, Jr., San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1181 days.

(21) Appl. No.: 11/025,617

(22) Filed: Dec. 29, 2004

(65) Prior Publication Data
US 2006/0140375 A1    Jun. 29, 2006

(51) Int. Cl.
*H04M 3/42* (2006.01)
(52) U.S. Cl. ........... 379/201.01; 379/210.01; 379/88.11; 379/88.12

(58) Field of Classification Search ............. 379/210, 379/201.01, 210.01, 88.11, 88.12; 340/657; 709/202
See application file for complete search history.

(56) References Cited

U.S. PATENT DOCUMENTS

| 4,853,952 | A  | * | 8/1989  | Jachmann et al. ......... 379/88.11 |
|-----------|----|---|---------|-------------------------------------|
| 6,339,640 | B1 |   | 1/2002  | Chen et al.                         |
| 6,556,659 | B1 |   | 4/2003  | Bowman-Amuah                        |
| 6,681,006 | B1 |   | 1/2004  | Pilkington et al.                   |
| 6,728,339 | B2 |   | 4/2004  | Kucmerowski et al.                  |
| 6,940,395 | B2 | * | 9/2005  | Steinmark ............... 340/309.16 |
| 6,957,257 | B1 | * | 10/2005 | Buffalo et al. ................ 709/224 |
| 2002/0055967 | A1 | * | 5/2002 | Coussement ................ 709/202 |
| 2004/0061616 | A1 | * | 4/2004 | Fischer et al. ............... 340/657 |

* cited by examiner

Primary Examiner — Quynh H Nguyen
(74) Attorney, Agent, or Firm — Jackson Walker L.L.P.

(57) ABSTRACT

An automated IVR apparatus for notifying entities of customer-specific information. An automated IVR application that enables subscribers to check the status of their DSL line and to report problems in real time. A "Service Restoration Callback" application enables a service provider to automatically contact a customer via telephone when service is restored after an outage. The customer can configure parameters concerning the received callback. An outage detection module checks all available systems for the status of a customer's service on a real-time, customer-by-customer, call-for-call basis.

14 Claims, 4 Drawing Sheets

SYSTEM AND METHOD FOR AUTOMATICALLY NOTIFYING A CUSTOMER VIA PHONE OF SERVICE RESTORATION

BACKGROUND OF THE INVENTION

1. Field of the Invention

The present invention relates to the field of automated interactive customer service. In particular, the present invention is an apparatus and method for providing caller-specific information in relation to an interruption in service.

2. Description of the Related Art

Internet service subscribers are subject to occasional loss or degradation of service due to problems or failures within various network elements. Subscribers typically contact the technical support department of their internet service provider (ISP) upon such a loss or degradation of service. This contact accounts for a significant cost to the ISP for answering support calls. Due to the volume of calls that may be received during a network event, such as an outage, a customer may need to wait on hold for an extended period, only to reach an agent who may not be able to help them. Oftentimes, a service provider will provide generic Interactive Voice Recorder (IVR) messaging when outages occur. Messaging is also often played at the call center level.

Generic messaging is not fully responsive to customer's needs. Without user-specific information, a customer may not be certain if an outage applies to them and may still wish to talk to an agent. Also, with generic messaging, there is typically a delay between confirmation of a problem and posting of the IVR message, and it is typically during this delay time that the highest initial volume of calls can occur. Generic messages also create a negative perception of service because in most cases, the message is also heard by callers not impacted by the event in question. An outage detection application can be used to advise a caller of an outage when they call, however it is typically left up to the customer to retry their service until it is restored. This causes customer frustration and encourages premature callbacks to the ISP.

Typically, the service provider will provide generic information and request the customer to try their service again "later". In some cases, an Estimated Time of Repair (ETR) may be offered. Another (costly) option is for a live agent to contact a customer when service is restored. Automated outbound calls can also be used but they are typically manually invoked and are not caller-specific.

Current systems that automatically handle a customer's call are not specific to the caller and generally are inattentive to the customer's need. There is a need for an improved automated response to a caller's reporting a problem with services.

SUMMARY OF THE INVENTION

The present invention provides an apparatus and method notifying entities of customer-specific information. In particular, the present invention provides an automated IVR application that enables subscribers to a service, such as an Internet service to check the status of their line and to report problems in real time. Furthermore, the customer can request or configure a callback to indicate service repair or return of service. The present invention accepts a notification parameter from a subscriber, detects a service status for the subscriber and notifies the subscriber of the service status in accordance with the notification parameter. The notification parameter can be contact information, such as an email address or telephone number or a call back time. The present invention provides an application that communicates with an outage detection tool and provides real-time information to callers regarding their service. The application may also send a status report to additional subscribers impacted by the service status of a particular subscriber. The application is further capable of sending customer-driven alerts to an ISP support. The application is designed to integrate with an outage detection application. A module within an IVR checks all available systems for the status of a customer's service on a real-time, customer-by-customer, call-for-call basis. Alternatively, the invention can transfer a caller to a live agent, the agent having access to the specifics of the customer's call. A Service Restoration Callback component enables a service provider to automatically contact a customer via telephone when service is restored after an outage. Parameters related to the Service Restoration Callback can be configured by the customer for convenience. Some typical callback parameters include, among others, a last time for callback, periodic update calls on line status, calling a separate phone line, multiple calls if calls remain unanswered. A monitor tracks the performance of the Service Restoration Callback component.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of an exemplary embodiment, taken in conjunction with the accompanying drawings, in which like elements have been given like numerals.

DETAILED DESCRIPTION OF THE INVENTION

In view of the above, the present invention through one or more of its various aspects and/or embodiments is presented to provide one or more advantages, such as those noted below.

The present invention reports the occurrence of a problem to a service provider and reports the resolution of the problem to a customer. The present invention can be used in conjunction with services such as electricity, water, cable TV service, satellite TV service, and internet service, among others. In an exemplary embodiment of the present invention, internet service is addressed. Internet service is a uniquely suited target for this application, since a customer is not necessarily aware of the service restoration immediately, whereas, for example, with electricity, restoration of power is immediately apparent. Additionally, an end user often cannot discern the difference between a service outage and a problem with their computer or modem.

The present invention describes an automated IVR application that enables DSL (digital subscriber line) subscribers to check the status of their DSL line and/or to report problems on their DSL line in real time. The application is designed to communicate to any existing or specifically built outage detection tool and to provide real-time information to callers regarding their DSL service. Alternatively, the present invention can transfer a caller to a live agent if needed. The invention is also comprises a "Service Restoration Callback" application. The application is further capable of sending alerts to an ISP as needed, such as a network reliability center (NRC), Tier 2 and Tier 1. The Service Restoration Callback enables a service provider to automatically contact a customer via telephone when service is restored after an outage. The application is designed to integrate with outage detection applications, such as an "IVR Isolate" application.

A module within an IVR checks all available systems for the status of a customer's service on a real-time, customer-by-customer, call-for-call basis. This checking may occur in the background during a call, or upon request or selection by the caller.

The present invention provides an option to callers who are impacted by a service interruption to receive an automated callback when the problem is cleared. This is accomplished by integrating an outbound calling application to an outage detection application (which is used for inbound calls). The outage detection application may be the same application that is used to notify the customer within the primary IVR, or an application specifically for checking status if available. The same application may also be used to deliver clearance calls to a customer for non-outage, user specific problems by integrating with a trouble ticketing system.

Figure 1:
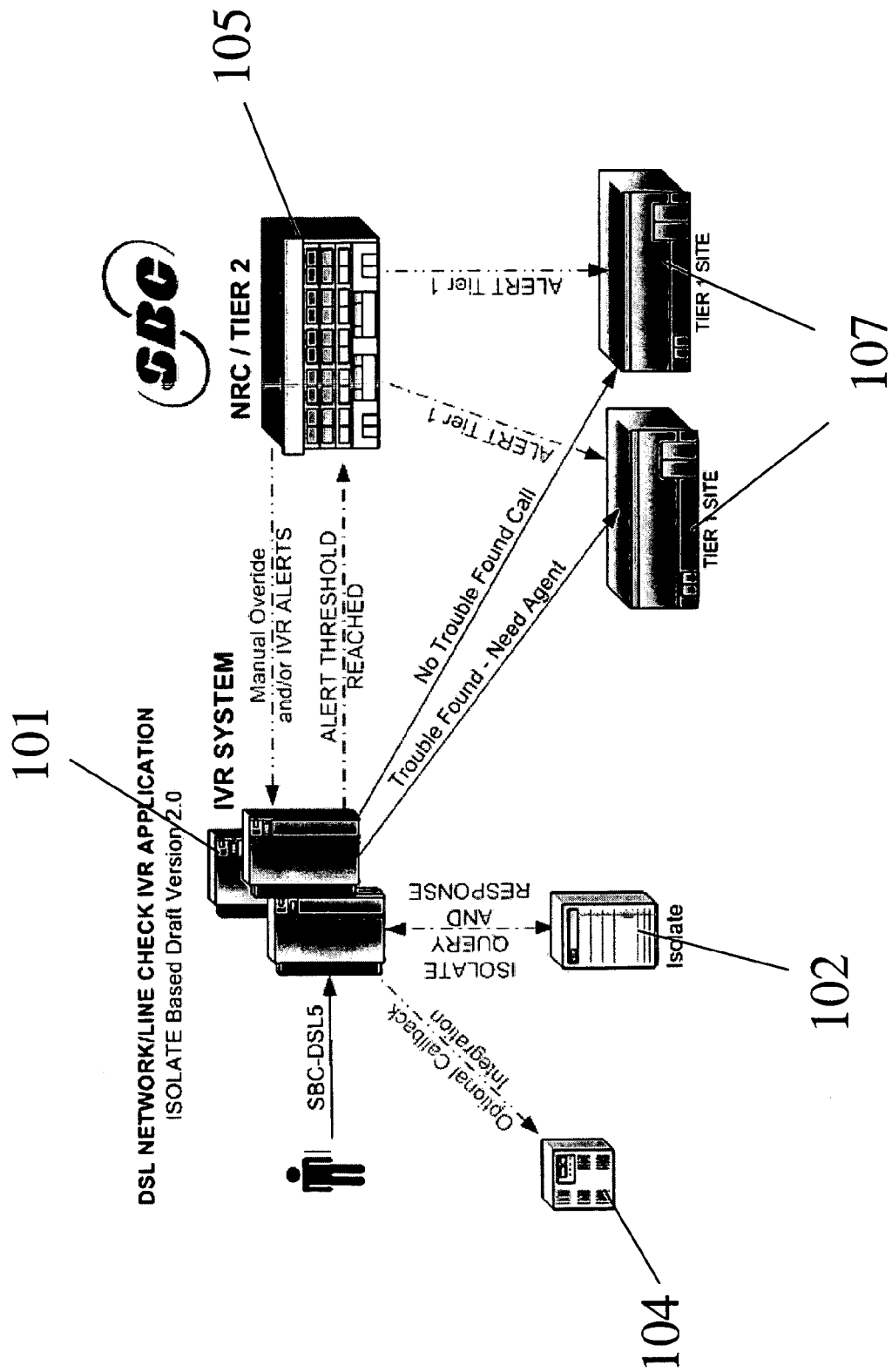
FIG. 1 shows a high level diagram illustrating the flow of traffic and information in one embodiment of the present invention.

FIG. 1 shows a high level diagram illustrating the flow of traffic and information in one embodiment of the present invention. The invention comprises an IVR 101, internet services, such as an NRC/Tier 2 site 105, and Tier 1 sites 107, ISOLATE (a service outage detection application) 102, and a callback component 104. In the example, the present invention uses a version of an existing tool known as ISOLATE, which is modified specifically for IVR integration. The IVR 101 communicates with ISOLATE 102 in order to obtain a status of a caller's service. The IVR communicates with internet services to alert the ISP to caller-entered problem reports. If an alert threshold is reached, an automatic message is sent to the NRC. The NRC can override the alert manually. Additionally, messages can be forwarded to Tier 1 support. Messages can be forwarded depending on whether a network event has been found in relation to the customer's concerns, or if there is no detected network event associated with the customer's call. Also, the NRC/Tier 2 can alert Tier 1 support of any issues concerning a customer alert, e.g., an alert threshold has been reached.

The IVR communicates with the callback component 104 to give the caller an option of receiving a notification once the service has been restored. Communication can occur, for example, via any Internet protocol (i.e. HTTP, HTTPs), across the open web, virtual private network (VPN), a dedicated frame relay, or any other form of connectivity. The application can use existing tools when available. Alternatively, the application can be designed to target custom designed APIs or the backend existing API of an existing tool. Any number of argument/value pairs can be interpreted by the application, and custom responses can be provided for each. Reserve or dummy values can also be sent with null or dummy data to enable fast implementation of future scripting and call flow requirements.

Figure 2:
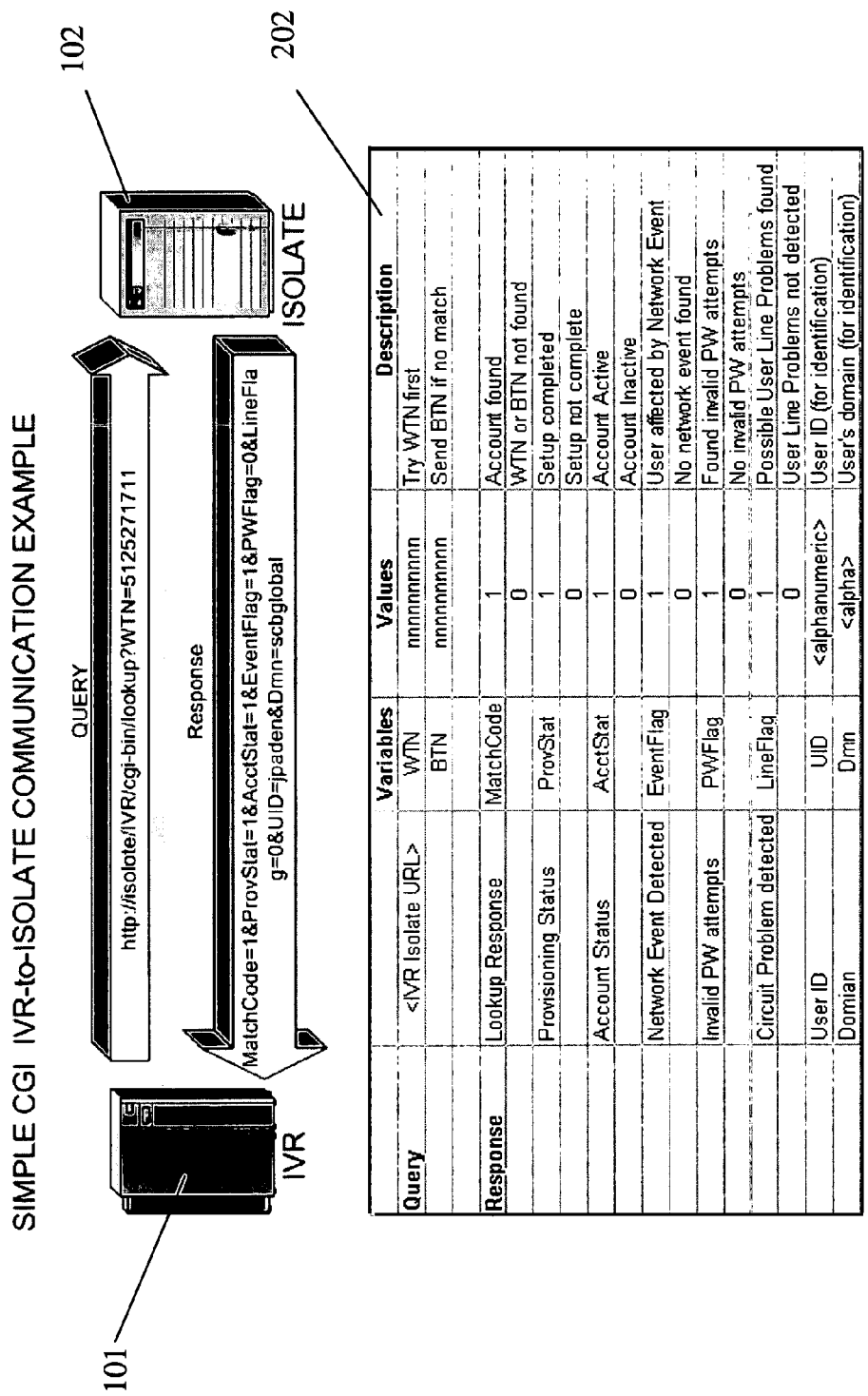
FIG. 2 is a lower level view of the communication characteristics between the IVR application and the IVR version of Isolate.

FIG. 2 is a lower level view of the communication characteristics between the IVR application and the IVR service outage detection application, such as ISOLATE. A state table 202 is shown comprising information on a caller account, including subscriber status and whether the present event affects the caller. Typically, the IVR 101 and ISOLATE 102 communicate via a query and response format. When a call enters the IVR platform 101, the Automatic Number ID (ANI) of the caller is first sent to Isolate to determine the status of an existing account. The response returns values stored in the state table of FIG. 2. In general an incoming caller is identified by a parameter such as name, address or other identifier to access outage information stored and or maintained by a service outage detection application.

Figure 3:
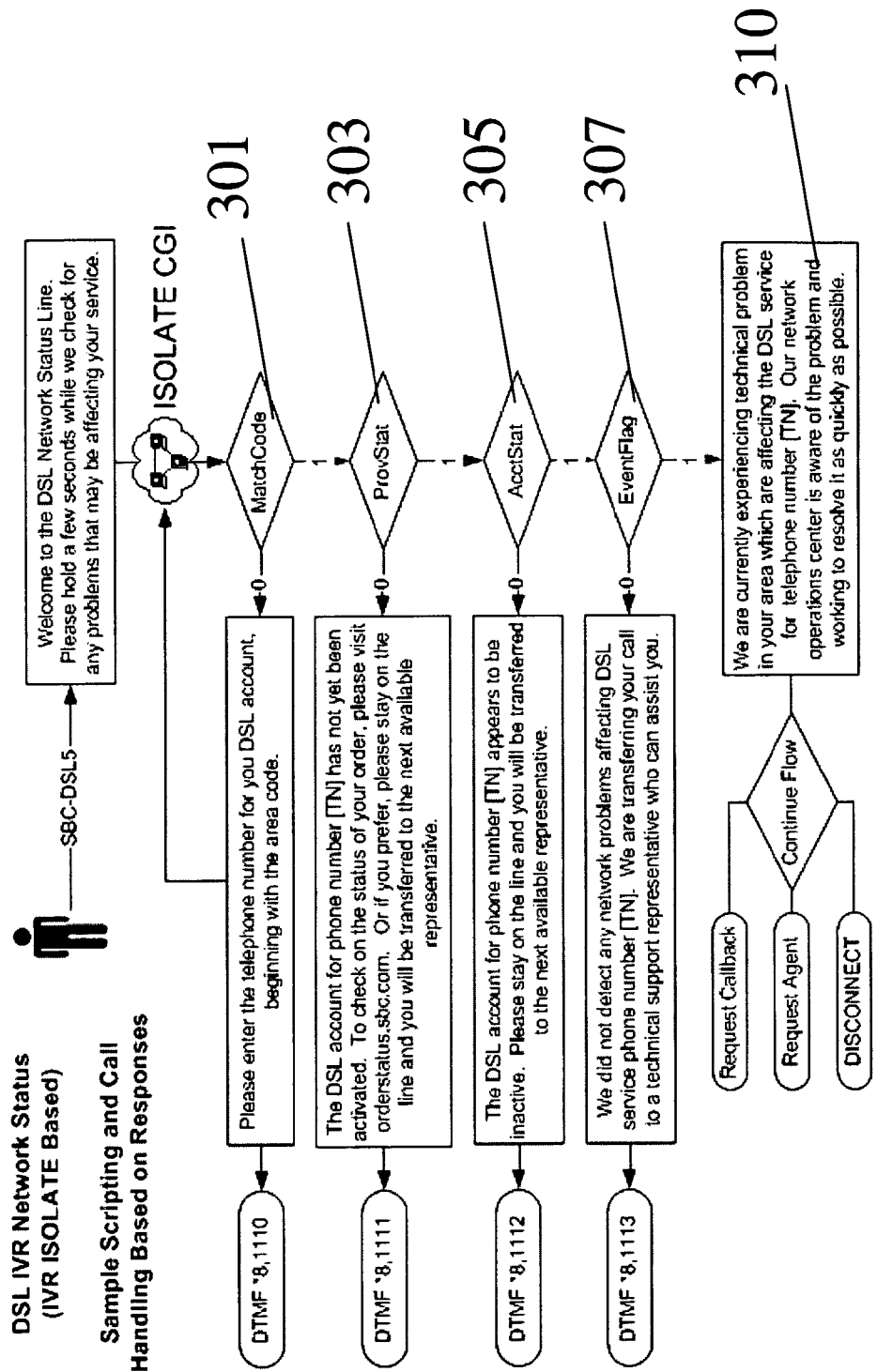
FIG. 3 shows an exemplary flow of a call based on various responses from the Isolate API.

FIG. 3 shows an exemplary flow of a call based on various responses from the Isolate API 102 response. First, the ANI is used to query the status of a caller's account 301. Using ANI as the first lookup criteria saves time and enables proactive messaging specifically for that caller. Other lookup criteria may include caller entered WTN (working telephone number of DSL service), or other account information such as account numbers, user ID, payment information, etc. If no account is located using the ANI, the application can request a WTN from the user. The application then queries using the ANI or CED (caller entered digits) against the outage detection application in order to retrieve the status of the customer's service. The IVR application can read back user-specific information, such as WTN or user ID, in order to increase customer confidence in the system. The application can interact with the caller using dual tone multi-frequency (DTMF) or voice recognition.

Once an account is located, a string is returned to the IVR indicating customer status. Typical checks include whether the account has been set up 303, whether the account is active 305, and whether the account is currently affected by a network event 307. If a negative answer is obtained at any of 301, 303, 305, or 307, the caller is redirected to an appropriate message and optionally referred to an agent for service. The IVR application of the present invention may exist as a module with a primary IVR, or as a standalone or destination IVR off of the primary IVR. In the latter case, if a call is to be transferred to an agent it can be done through "8*" or other release transfer type where available.

If it is found that the caller is affected by a network event, the IVR plays a custom message 310 to the caller, providing available details about the current condition. For example, an estimated time to repair (ETR) may be provided if available. Various attributes may be returned which indicate different reasons for a loss of service condition. Those returned attributes can also be used to determine a continued direction of the call flow. The application may offer to transfer the caller to an existing callback application. Additionally, the application retains in memory (or in a database) a caller's ANI where an outage is confirmed, and offers an immediate status update to the caller if that ANI calls back. If ANI is not used as the original lookup criteria, the alternate captured criteria (i.e. CED) can be stored in conjunction with the ANI, so that the caller does not need to be prompted again. Where applicable, the application stores additional attributes regarding outages, such as a PoP (point of presence) name, and uses those attributes to expedite the outage detection process on future calls by cross referencing a table of customers (such as those mapped to that PoP). In some cases, this can reduce overhead or bandwidth requirements.

If no problem is found from the IVR query to the outage detection application, the caller is given an option to send an automatic problem report to the internet services as needed.

Trouble reports may also be sent automatically using configurable business rules and thresholds that can be specified with the IVR. The data from the reports can be used to trigger additional alerts out to call centers and also to trigger "possible" outage treatments with the IVR application.

Alternatively, the application can route calls to alternate physical locations, or to unique agent groups or skill groups based on the previous IVR interaction, for example, by sending unique Direct Number Information Service (DNIS), alternate Direct Inward Dialing (DID). Where computer-telephony-integration (CTI) or other data connectivity is available, details of the customers IVR interaction may also be sent to the agent or stored in a ticketing or customer record system.

Where integration to a callback application has been implemented, the customer is given the option to receive a callback with the results of their problem report. An interface will also be available to enable the provider to turn the functionality on/off, or to override normal call flows with custom treatment or messaging.

The present invention comprises three primary components: an information gathering component, a status check component, and the callback component. All of the components can reside with a single primary platform, or separately on their own platforms, or in any combination.

Figure 4:
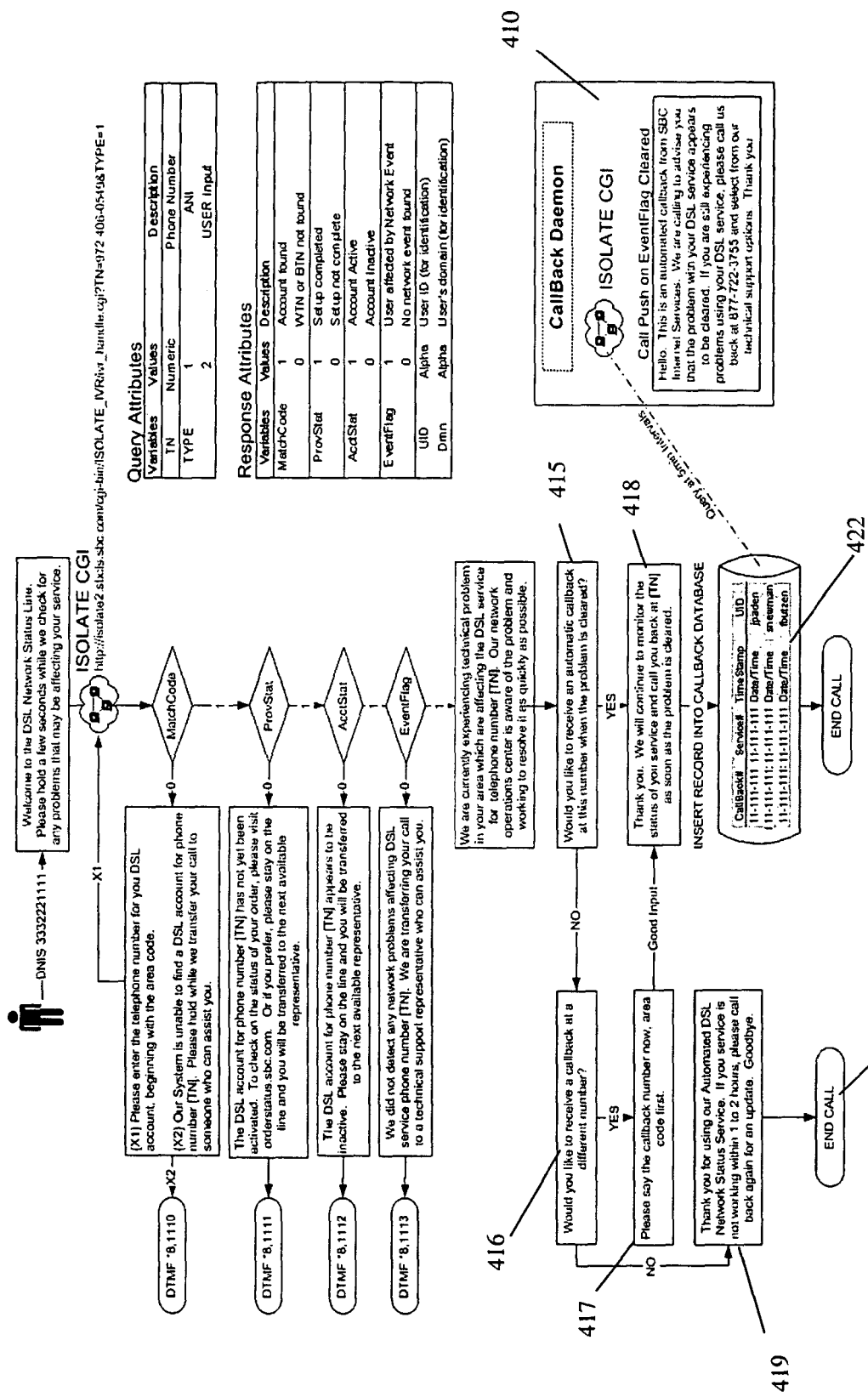
FIG. 4 illustrates a detailed basic implementation of the call flow of FIG. 3.

FIG. 4 illustrates a detailed basic implementation of the call flow of FIG. 3. The information gathering component is integrated into the same IVR application as the outage detection application. The obtained data is sent in real time over IP to a remote application, labeled Callback Daemon 410, where the status check and callback is performed. Any protocol can be used, and may also be in the form of near real-time file transfers such as, for example, FTP (file transfer protocol) or SCP (single channel protocol) exchanges at 5-minute intervals.

Once a network event is confirmed in relation to an inbound call, the caller is provided the option for the callback 415. If the caller chooses to receive a callback, the application collects information from the caller. Alternatively, the caller can be transferred to an agent if requested during the interaction (such as if service is not restored). During an agent callback where a callback is still pending, the agent may cancel the pending callback upon request of the customer through a GUI interface, just as the caller can cancel via telephone.

Additionally, the present invention enables an agent to insert any information into the reporting module that the customer provides during a live contact, including customer satisfaction, confirmation problem was cleared when callback was received, adjustment of times for callbacks, etc.

Once a caller chooses to receive a callback, various caller preferences are then inserted into a database. In the example of FIG. 4, the caller is asked whether he would like to receive an automatic callback at the present number 415. If the caller agrees, a confirmation message is sent 418, and the number is inserted into a database 422. If the caller disagrees, the caller is given the option of receiving a callback at a different number 416. If customer agrees to receive a call at a second number, he will then be asked to enter the number at which he desires to receive the callback 417. The caller receives the confirmation message 418 and the phone number is inserted into the database 422. A customer that does not wish to receive a callback at a different number is referred to a "Thank You" message 419 and exits the system 420.

FIG. 4 shows an example of one configurable parameter within the callback system. Several other configurable parameters are also possible. One example of a callback parameter is a request for a "latest time for callback" (callback window) from customer within the appropriate time zone of the call's physical location. Thus, if the problem is not cleared prior to "last time for callback," a call can be generated at that time which is selected with a unique message (as specified by the provider). As another example, the application can be configured to use available forms of answering or voicemail detection, or to deliver a message regardless of answer type. As another example, the application can be configured to replay the same message only once or for a number of times. As yet another example, the application can make multiple call attempts in response to unanswered calls or to call only once. As yet another example, multiple messages can be played selectively by the application. These multiple messages can be designed automatically based on responses returned during a status check. As yet another example, additional scripting can be played to the caller to provide any special instructions (such as rebooting the computer or power-cycling the modem). The manual interface also enables specification of unique/custom messages which may be selected from prerecorded messages or recorded in real time by the service provider.

Once the caller has configured the callback application, the callback application then checks the status every X minutes (X=a length of time configurable by the provider) using the same application that originally detected the outage. Once the outage is clear, the callback is invoked to the customer.

Where applicable, the application stores additional attributes regarding outages, such as a PoP name, and use those attributes to expedite the callback process by contacting all customers tied to that PoP once the status check comes back clear on a single customer tied to that PoP. An interface is provided enable a manual push of calls to customers or groups of customers. In one example related to PoP, the service provider may wish to push the calls proactively/manually once they are aware of a clearance affecting a group of users. The callback application can further be configured to make status or update calls at intervals as specified by the provider (within the acceptable callback window specified by the caller). Update calls can be triggered automatically or manually, either to single customers or to groups of customers. A timeframe can also be specified by the customer during an information gathering session. In practice, an update call would be sent automatically where an outage persists beyond the normal clearance timeframe. The scripting of the callback message is also configurable and can be unique for each callback. Any parameters set previously by the customer can be changed during a callback from the provider via an interaction between the caller and the IVR application. Parameters may also be changed or overridden by the provider manually or automatically based on changes in outage condition and/or pre-established business rules.

Access to the callback application may be optionally configured by the ISP to require some type of authentication from the user in order to prevent abuse. If an impacted customer initiates a second service call to the provider while an outage still persists, that customers ANI or CED can be used by the application to check outage status proactively and provide customized status updates specific to that customer. During such an interaction, any preset callback parameters can be changed by the customer, including cancellation of the callback if desired.

A reporting module can track actions of the application, i.e., attempts made by the callout application, success rates, interaction detail of callbacks, cancelled callbacks, expiration of an estimated time to repair without restoration of service, etc. The reporting module can track specific detail related to any of the interactions on inbound or outbound contacts described above, and present that data in a GUI format for performance and cost savings analysis. The reporting module integrates to a database, such as System of Record or Customer Relation Database, thereby enabling an ability to track the initial callback request, callback attempts, failures, success, parameter changes, overrides, or any other activity within any of the primary components. Typically a Case or Contact Record is created for this tracking. Integration is delivered in real time and can be tracked as a single case with multiple entries, or as individual cases, thereby enabling agents to be aware of the recorded activity in case a customer's call is transferred to them.

Alternately, the telephony call itself could be physically sent to the remote application once the caller indicates they want a callback (eliminating the need for the data connectivity, but requiring a telephony connection).

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium, as listed herein and including art-recognized equivalents, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A method for notifying a subscriber of a service status for a service comprising:
configuring an interactive voice response system to:
accept, from a subscriber, a service restoration notification request and callback preferences associated with the service restoration notification request, wherein the callback preferences indicate a threshold time of day for callback;
invoke an outage detection application operable to detect a service outage;
receive, from the outage detection application, outage detection information indicative of whether the subscriber is affected by the service outage; and
responsive to receiving outage detection information indicating the subscriber as being affected by the service outage, modifying a callback database to include an entry corresponding to the subscriber; and
configuring a callback application, having access to the callback database to:
invoke automatically the outage detection application to determine a status of the service outage; and
respond to a restoration indication from the outage detection application, when a time of day at which the restoration indication is received is prior to the threshold time of day for callback, by initiating a call to the subscriber.

2. The method of claim 1, wherein the service includes a computer network service.

3. The method of claim 1, wherein configuring the interactive voice response system includes configuring the interactive voice response to accept, from the subscriber a cancellation of the service restoration notification request.

4. The method of claim 1, wherein the callback preferences indicate a telephone number.

5. The method of claim 1, wherein the service is an Internet service.

6. The method of claim 1, wherein initiating the call includes initiating a first call and wherein configuring the callback application includes configuring the callback application to repeat a call attempt when the first call is unanswered.

7. The method of claim 1, further comprising sending a status report to additional subscribers impacted by the service status.

8. The method of claim 1, wherein the service restoration notification request is automatically generated in response to receiving a problem report.

9. The method of claim 1, further comprising configuring the callback application to respond to outage detection information indicating that the service outage extends beyond an estimated time to repair.

10. The method of claim 1, wherein the service status is selected from the group consisting of set up, active, and affected by a network event.

11. A non-transitory computer readable memory medium containing executable program instructions for notifying a subscriber of a service status for a service, the program instructions including instructions to:
accept, from a subscriber, a service restoration notification request and callback preferences associated with the service restoration notification request, wherein the callback preferences indicate a threshold time of day for callback;
invoke an outage detection application operable to detect a service outage; receive, from the outage detection application, outage detection information indicative of whether the subscriber is affected by the service outage;
responsive to receiving outage detection information indicating the subscriber as being affected by the service outage, modifying a callback database to include an entry corresponding to the subscriber;

invoke automatically the outage detection application to determine a status of the service outage; and respond to a restoration indication from the outage detection application, when at time of day at which the restoration indication is received is prior to the threshold time of day for callback, by initiating a call to the subscriber.

12. A system for notifying a subscriber of a service status for a communications network service comprising:

a processor having access to a computer readable medium, the computer readable medium including program instructions, executable by the processor, the program instructions including instructions to:

accept, from a subscriber, a service restoration notification request and callback preferences associated with the service restoration notification request, wherein the callback preferences indicate a threshold time of day for callback;

invoke an outage detection application operable to detect a service outage;

receive, from the outage detection application, outage detection information indicative of whether the subscriber is affected by the service outage;

responsive to receiving outage detection information indicating the subscriber as being affected by the service outage, modifying a callback database to include an entry corresponding to the subscriber;

invoke automatically the outage detection application to determine a status of the service outage; and respond to a restoration indication from the outage detection application, when a time of day at which the restoration indication is received is prior to the threshold time of day for callback, by initiating a call to the subscriber.

13. The system of claim 12, wherein the communications network service comprises an Internet service.

14. The system of claim 12, wherein the system outputs configurable options to the subscriber for determining the notification parameter.

\* \* \* \* \*